(No Model.)

J. G. A. KITCHEN.
BRAKE APPARATUS FOR CYCLES OR OTHER ROAD VEHICLES.

No. 530,693. Patented Dec. 11, 1894.

Witnesses
C. M. Werle
Herbert C. Peck

Inventor
J. G. A. Kitchen
by O. E. Duff
Attorney

UNITED STATES PATENT OFFICE.

JOHN GEORGE AULSEBROOK KITCHEN, OF ARDWICK, NEAR MANCHESTER, ENGLAND.

BRAKE APPARATUS FOR CYCLES OR OTHER ROAD-VEHICLES.

SPECIFICATION forming part of Letters Patent No. 530,693, dated December 11, 1894.

Application filed December 18, 1893. Serial No. 493,928. (No model.)

*To all whom it may concern:*

Be it known that I, JOHN GEORGE AULSEBROOK KITCHEN, a subject of the Queen of Great Britain and Ireland, residing at Ardwick, near Manchester, in the county of Lancaster, England, have invented Improvements in Brake Apparatus for Cycle or other Road Vehicles, of which the following is a specification.

The object of this invention is to provide a simple, efficient, cheap and light brake apparatus for cycles or other road vehicles. For this purpose I dispense with the levers and rods usually employed and instead of the ordinary brake shoe or spoon I provide a hollow brake shoe consisting of an air tight chamber, which may be of bellows or similar form and is held in a suitable frame secured, in the case of a cycle brake to the front fork of the machine. The interior of the chamber is connected by a pipe with a hollow air tight compressible vessel or chamber so arranged that the rider can conveniently compress it when desired. The arrangement is such that upon the compression of the air tight vessel or chamber the hollow brake shoe will become expanded or distended sufficiently to cause it to bear upon and exert a yielding or elastic pressure upon the tire of the wheel with which the brake is to be used and thus retard the rotation of such wheel, and upon releasing the compressible vessel or chamber the brake shoe will automatically contract and release the wheel tire. With this arrangement the chamber being resilient is less liable to injure the casings of pneumatic wheel tires than an ordinary spoon brake.

Figure 1:
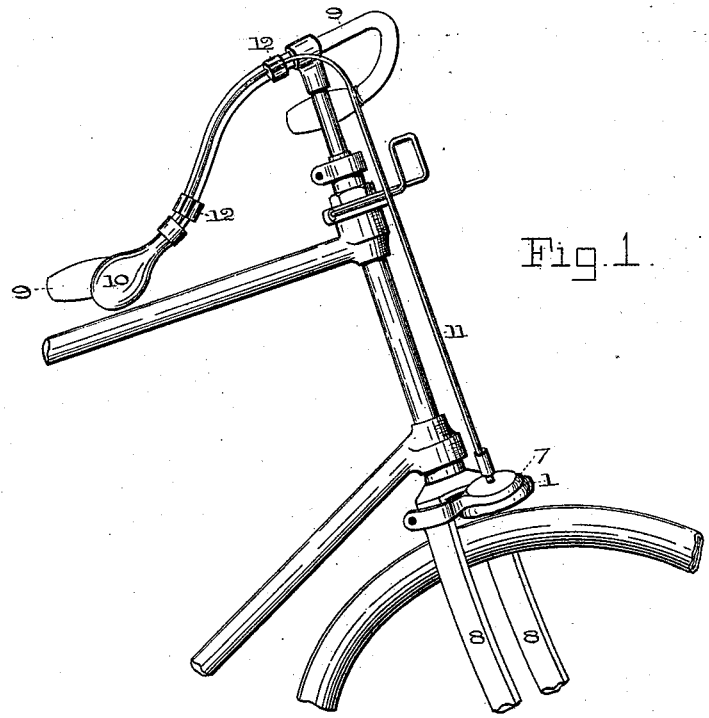
Figure 2:
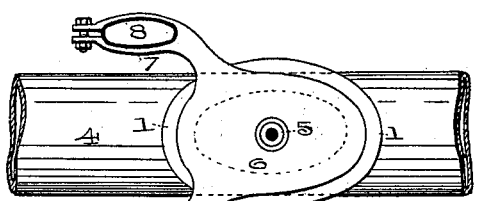
Figure 3:
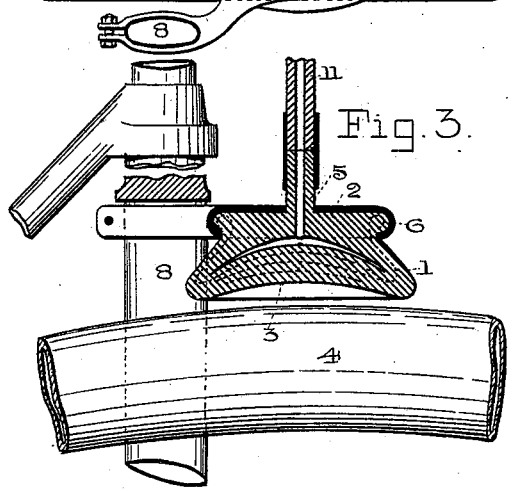

In the accompanying drawings Figure 1 is a perspective view showing a pneumatic brake according to this invention fitted to the front fork of a cycle; Fig. 2, a plan to an enlarged scale of a detachable holder for containing the air tight chamber; Fig. 3, a sectional elevation, and Fig. 4 a cross section of the same.

Figure 4:
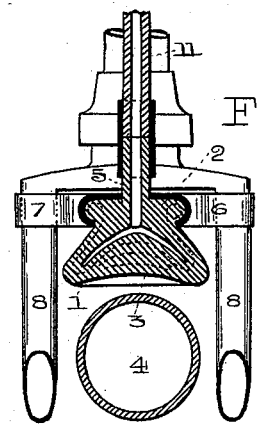

1 is the air tight contractile chamber capable of being inflated hereinafter referred to as the brake shoe. It is of oval shape in plan, with extensible walls, or they may be after the manner of bellows or concerting walls. The upper part or top 2 is flat on the outside while the lower side 3 that comes in contact with the wheel tire 4 is made considerably thicker and concave on the under side so as to partly conform to the shape of the tire and convex on its upper side as shown in Figs. 3 and 4 so as to fill up the air space when in its normal or deflated condition as much as possible. The shoe is provided with a short tube 5 formed in one with and projecting from its upper part 2.

The brake shoe is formed of molded india rubber strengthened with canvas as shown by the dotted lines in Figs. 3 and 4. Its upper part 2 projects so as to form a flange which fits into a detachable frame or holder 6. The holder is of inverted cup shape and is provided with projecting arms 7 which being provided with bolts and nuts form a clamping device for securing it to the front fork 8 of the machine immediately beneath the crown thereof.

In a convenient position on the machine, it may be near one end of the handle bar 9, as shown a flexible air tight pear shaped india rubber ball 10 is provided. It is connected by a small tube 11 to the pipe 5 on the brake shoe as shown in Figs. 3 and 4. The tube 11 which may advantageously be of flexible material such as india rubber is secured to the handle bar by spring clips 12 or other convenient means that permit of ready detachment if required. The bottom part 3 of the brake shoe where it comes in contact with the wheel tire may be faced with canvas, leather or other suitable material to increase friction or reduce wear. The brake is operated by compressing the ball 10, thus forcing the air through the tube 11, which is preferably of small bore, into and between the top and bottom sides of the brake shoe, the upper side of which is firmly held by the holder 6, thus forcing the lower side against the wheel tire. When the ball is released it and the brake shoe assume their normal positions. By this arrangement a resilient brake pressure is easily applied and is less liable to injure the casings of pneumatic tires than brake apparatus heretofore employed. It is much lighter in weight and can be applied to existing machines wherein no preparation has been made for applying the ordinary class of brake. Moreover there is nothing that can rattle when riding and it can readily be adjusted to suit the diameter of the wheel.

The same arrangement of a brake can be applied to carriages thus dispensing with the usual levers and rods, but in this case hydraulic pressure is preferably employed.

I wish it to be understood that the pressure brake as before described can be variously modified and arranged to suit different classes of cycles and the like machines without departure from the essential features of this invention.

What I claim is—

1. A stationarily mounted hollow brake shoe with a flexible movable tread or surface arranged to be moved toward or from the wheel into or out of operative braking position by variations of the air pressure within the hollow shoe, substantially as described.

2. A brake comprising a hollow brake shoe having a flexible or movable tread arranged to be forced against the wheel into braking position by expansion of the shoe, and operating means substantially as described to expand the shoe and apply the brake, substantially as described.

3. As a new article of manufacture, a pneumatic brake consisting of an air tight flexible tube terminating at one end in an air tight contractile hollow brake shoe and at the other end in an air tight collapsible vessel.

4. A bicycle having a stationary holder secured over one of the wheels, an expansible brake shoe carried by said holder, an air compressor on the frame, and a tube connecting said compressor and shoe so that the shoe can be expanded against the wheel tire by the compressor, substantially as described.

5. A brake composed of a suitably supported brake shoe composed of an expansible body arranged to be forced against the tire by the internal pressure within the shoe, and operating connections for said shoe composed of a collapsible body and a conduit therefrom to said shoe, substantially as described.

In testimony whereof I have signed my name to this specification in the presence of two subscribing witnesses.

JOHN GEORGE AULSEBROOK KITCHEN.

Witnesses:
JAMES WOODS,
10 *Rosina Street, Ashton Old Road, Fairfield, Manchester.*
F. M. C. SCOTT,
89 *Victoria Street, Liverpool.*